(12) United States Patent
Jeong et al.

(10) Patent No.: US 8,638,353 B2
(45) Date of Patent: Jan. 28, 2014

(54) VIDEO PROCESSING IN A MULTI-PARTICIPANT VIDEO CONFERENCE

(75) Inventors: Hyeonkuk Jeong, San Jose, CA (US); Joe Abuan, Milpitas, CA (US); Jim Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 12/870,780

(22) Filed: Aug. 27, 2010

(65) Prior Publication Data

US 2010/0321469 A1 Dec. 23, 2010

Related U.S. Application Data

(62) Division of application No. 11/118,553, filed on Apr. 28, 2005, now Pat. No. 7,817,180.

(51) Int. Cl.
*H04N 7/10* (2006.01)
(52) U.S. Cl.
USPC .................................................. 348/14.01
(58) Field of Classification Search
USPC ............... 348/14.01, 14.07, 14.09, 14.16
See application file for complete search history.

(56) References Cited

U.S. PATENT DOCUMENTS

| | | | |
|---|---|---|---|
| 4,847,829 A | 7/1989 | Tompkins et al. |
| 5,319,682 A | 6/1994 | Clark |
| 5,392,285 A | 2/1995 | Kurts |
| 5,513,182 A | 4/1996 | Kawamura et al. |
| 5,533,112 A | 7/1996 | Danneels |
| 5,548,346 A | 8/1996 | Mimura et al. |
| 5,604,738 A | 2/1997 | Shibata et al. |
| 5,646,678 A | 7/1997 | Bonja et al. |
| 5,838,664 A | 11/1998 | Polomski |
| 5,896,128 A | 4/1999 | Boyer |
| 5,933,417 A | 8/1999 | Rottoo |

(Continued)

FOREIGN PATENT DOCUMENTS

| | | |
|---|---|---|
| EP | 0744857 | 11/1996 |
| EP | 1875769 | 1/2008 |

(Continued)

OTHER PUBLICATIONS

Portions of prosecution history of U.S. Appl. No. 13/011,848, Mar. 29, 2012, Jeong, Hyeonkuk, et al.

(Continued)

*Primary Examiner* — Duc Nguyen
*Assistant Examiner* — Theodore Ndje
(74) *Attorney, Agent, or Firm* — Fay Kaplun & Marcin, LLP

(57) ABSTRACT

Some embodiments provide an architecture for establishing multi-participant video conferences. This architecture has a central distributor that receives video images from two or more participants. From the received images, the central distributor generates composite images that the central distributor transmits back to the participants. Each composite image includes a set of sub images, where each sub image belongs to one participant. In some embodiments, the central distributor saves network bandwidth by removing each particular participant's image from the composite image that the central distributor sends to the particular participant. In some embodiments, images received from each participant are arranged in the composite in a non-interleaved manner. For instance, in some embodiments, the composite image includes at most one sub-image for each participant, and no two sub-images are interleaved.

15 Claims, 16 Drawing Sheets

(56) References Cited

U.S. PATENT DOCUMENTS

| | | |
|---|---|---|
| 5,936,662 A | 8/1999 | Kim et al. |
| 5,953,049 A | 9/1999 | Horn et al. |
| 5,964,842 A | 10/1999 | Packard |
| 6,008,838 A | 12/1999 | Iizawa |
| 6,167,033 A | 12/2000 | Chang et al. |
| 6,167,432 A | 12/2000 | Jiang |
| 6,311,224 B1 | 10/2001 | Packard |
| 6,456,335 B1 | 9/2002 | Miura et al. |
| 6,487,578 B2 | 11/2002 | Ranganathan |
| 6,496,216 B2 | 12/2002 | Feder et al. |
| 6,624,841 B1 | 9/2003 | Buchner et al. |
| 6,633,985 B2 | 10/2003 | Drell |
| 6,697,341 B1 | 2/2004 | Roy |
| 6,697,476 B1 | 2/2004 | O'Malley et al. |
| 6,711,212 B1 | 3/2004 | Lin |
| 6,728,221 B1 | 4/2004 | Shaffer et al. |
| 6,744,460 B1 | 6/2004 | Nimri et al. |
| 6,757,005 B1 | 6/2004 | Elbaz et al. |
| 6,760,749 B1 | 7/2004 | Dunlap et al. |
| 6,882,971 B2 | 4/2005 | Craner |
| 6,915,331 B2 | 7/2005 | Fuller et al. |
| 6,989,856 B2 | 1/2006 | Firestone et al. |
| 7,096,037 B2 | 8/2006 | Canova, Jr. et al. |
| 7,266,091 B2 | 9/2007 | Singh et al. |
| 7,280,492 B2 | 10/2007 | Magnuski |
| 7,313,593 B1 | 12/2007 | Pulito et al. |
| 7,321,382 B2 | 1/2008 | Okajima et al. |
| 7,321,384 B1 * | 1/2008 | Wu et al. .................. 348/14.08 |
| 7,328,240 B2 * | 2/2008 | El-Gebaly et al. ............ 709/204 |
| 7,362,349 B2 | 4/2008 | Nelson et al. |
| 7,379,450 B2 | 5/2008 | Gu et al. |
| 7,394,481 B2 | 7/2008 | Wang et al. |
| 7,421,471 B2 | 9/2008 | Van Datta |
| 7,454,460 B2 | 11/2008 | Ivashin |
| 7,474,326 B2 | 1/2009 | Le Pennec |
| 7,474,634 B1 | 1/2009 | Webster et al. |
| 7,492,387 B2 | 2/2009 | Yang et al. |
| 7,577,110 B2 | 8/2009 | Zimmermann et al. |
| 7,606,181 B1 | 10/2009 | Whynot et al. |
| 7,627,678 B2 | 12/2009 | Datta et al. |
| 7,653,250 B2 | 1/2010 | Jeong et al. |
| 7,692,682 B2 | 4/2010 | Pun et al. |
| 7,711,052 B2 * | 5/2010 | Hannuksela et al. .... 375/240.27 |
| 7,817,180 B2 | 10/2010 | Jeong et al. |
| 7,864,209 B2 | 1/2011 | Jeong et al. |
| 7,881,235 B1 | 2/2011 | Arthur et al. |
| 7,899,170 B2 | 3/2011 | Jeong et al. |
| 7,949,117 B2 | 5/2011 | Jeong et al. |
| 2001/0019354 A1 | 9/2001 | Einarsson et al. |
| 2002/0126626 A1 | 9/2002 | Singh et al. |
| 2002/0154210 A1 | 10/2002 | Ludwig et al. |
| 2003/0217158 A1 | 11/2003 | Datta |
| 2004/0022202 A1 * | 2/2004 | Yang et al. .................. 370/261 |
| 2004/0028199 A1 | 2/2004 | Carlson |
| 2004/0215722 A1 | 10/2004 | Mukherjee |
| 2004/0233990 A1 | 11/2004 | Sekiguchi et al. |
| 2004/0257434 A1 | 12/2004 | Davis et al. |
| 2005/0018828 A1 | 1/2005 | Nierhaus et al. |
| 2005/0086273 A1 | 4/2005 | Loebbert et al. |
| 2005/0097169 A1 | 5/2005 | Mukherjee et al. |
| 2005/0099492 A1 | 5/2005 | Orr |
| 2005/0286443 A1 | 12/2005 | McMillen et al. |
| 2006/0029092 A1 | 2/2006 | Luo et al. |
| 2006/0146737 A1 | 7/2006 | Ohrstrom Sandgren et al. |
| 2006/0187860 A1 | 8/2006 | Li |
| 2006/0245377 A1 | 11/2006 | Jeong et al. |
| 2006/0245378 A1 | 11/2006 | Jeong et al. |
| 2006/0245379 A1 | 11/2006 | Abuan et al. |
| 2009/0252315 A1 | 10/2009 | Ratmanski et al. |
| 2010/0017606 A1 | 1/2010 | Bradley et al. |
| 2010/0189178 A1 | 7/2010 | Pun et al. |
| 2011/0074914 A1 | 3/2011 | Jeong et al. |
| 2011/0116409 A1 | 5/2011 | Jeong et al. |
| 2011/0205332 A1 | 8/2011 | Jeong et al. |

FOREIGN PATENT DOCUMENTS

| | | |
|---|---|---|
| EP | 1877148 | 1/2008 |
| EP | 1878229 | 1/2008 |
| EP | 1936996 | 6/2008 |
| EP | 11192109 | 12/2011 |
| EP | 11192110 | 12/2011 |
| EP | 2439945 | 4/2012 |
| EP | 12164796 | 4/2012 |
| EP | 2457625 | 5/2012 |
| GB | 1342781 | 1/1974 |
| GB | 2313250 | 11/1997 |
| JP | 08-251567 | 9/1996 |
| JP | 09-214924 | 8/1997 |
| JP | 10-028260 | 1/1998 |
| JP | 10-066088 | 3/1998 |
| JP | 11-234654 | 8/1999 |
| JP | 11-239331 | 8/1999 |
| JP | 2001-128132 | 5/2001 |
| WO | WO 99/62259 | 12/1999 |
| WO | WO 2004/030369 | 4/2004 |
| WO | WO 2006/116644 | 11/2006 |
| WO | WO 2006/116659 | 11/2006 |
| WO | WO 2006/116750 | 11/2006 |

OTHER PUBLICATIONS

Updated portions of prosecution history of U.S. Appl. No. 13/099,331, Apr. 2, 2012, Jeong, Hyeonkuk, et al.

Updated portions of prosecution history of U.S. Appl No. 12/702,287, May 3, 2012, Pun, Thomas, et al.

Portions of prosecution history of EP11192110, Apr. 25, 2012 (mailing date), Apple Inc.

U.S. Appl. No. 13/543,733, Jul. 6, 2012, Jeong, Hyeonkuk, et al.

Updated portions of prosecution history of U.S. Appl. No. 13/011,848, Jun. 27, 2012, Jeong, Hyeonkuk, et al.

Updated portions of prosecution history of U.S. Appl. No. 13/099,331, Jul. 9, 2012, Jeong, Hyeonkuk, et al.

Portions of prosecution history of EP12164796, Jun. 27, 2012, Apple Inc.

Portions of prosecution history of U.S. Appl. No. 13/099,331, Jun. 2, 2011, Jeong, Hyeonkuk, et al.

Updated portions of prosecution history of EP06758716, Jun. 28, 2011 (mailing date), Apple Inc.

Updated portions of prosecution history of EP08075236, Jun. 28, 2011 (mailing date), Apple Inc.

Thom, Gary A., "H.323: The Multimedia Communications Standard for Local Area Networks," Dec. 1996, pp. 52-56, IEEE Communications Magazine.

Updated portions of prosecution history of U.S. Appl. No. 13/099,331, Mar. 21, 2012, Jeong, Hyeonkuk, et al.

Updated portions of prosecution history of U.S. Appl. No. 12/702,287, Feb. 3, 2012, Pun, Thomas, et al.

Updated portions of prosecution history of EP06769904, Dec. 27, 2011 (mailing date), Apple Inc.

Portions of prosecution history of EP11192109, Mar. 8, 2012 (mailing date), Apple Inc.

Updated portions of prosecution history of EP06758716, Jan. 25, 2012 (filing date), Apple Inc.

Updated portions of prosecution history of EP08075236, Jan. 26, 2012 (filing date), Apple Inc.

U.S. Appl. No. 13/099,331, filed May 2, 2011, Jeong, Hyeonkuk, et al.

Updated portions of prosecution history of U.S. Appl. No. 11/118,297, Apr. 21, 2011, Jeong, Hyeonkuk, et al.

Portions of prosecution history of EP 06769904.1, Feb. 23, 2011 (mailing date), Apple Inc.

Portions of prosecution history of EP 06758716.2, May 19, 2011 (mailing date), Apple Inc.

Portions of prosecution history of EP 08075236.3, Mar. 10, 2011 (mailing date), Apple Inc.

U.S. Appl. No. 10/877,507, filed Jun. 25, 2004, Arthur, Bruce, et al.

U.S. Appl. No. 12/955,902, filed Nov. 29, 2010, Jeong, Hyeonkuk, et al.

(56) References Cited

OTHER PUBLICATIONS

U.S. Appl. No. 13/011,848, filed Jan. 21, 2011, Jeong, Hyeonkuk, et al.
Portions of prosecution history of U.S. Appl. No. 11/118,931, Jan. 14, 2011, Jeong, Hyeonkuk, et al.
Portions of prosecution history of U.S. Appl. No. 11/118,554, Dec. 9, 2009, Jeong, Hyeonkuk, et al.
Portions of prosecution history of U.S. Appl. No. 11/118,932, Mar. 24, 2010, Abuan, Joe, et al.
Portions of prosecution history of U.S. Appl. No. 11/118,555, Dec. 2, 2010, Jeong, Hyeonkuk, et al.
Portions of prosecution history of U.S. Appl. No. 12/955,902, Jan. 24, 2011, Jeong, Hyeonkuk, et al.
Portions of prosecution history of U.S. Appl. No. 11/118,297, Jan. 11, 2011, Jeong, Hyeonkuk, et al.
Portions of prosecution history of U.S. Appl. No. 11/118,553, Sep. 21, 2010, Jeong, Hyeonkuk, et al.
Portions of prosecution history of U.S. Appl. No. 11/118,615, Feb. 16, 2010, Pun, Thomas, et al.
Portions of prosecution history of U.S. Appl. No. 12/702,287, Nov. 5, 2010, Pun, Thomas, et al.
International Preliminary Report on Patentability for PCT/US2006/016123, Apr. 28, 2009, Apple Computer, Inc.
International Search Report and Written Opinion of PCT/US2006/016123, Sep. 26, 2008 (mailing date), Apple Computer, Inc.
International Search Report and Written Opinion for PCT/US2006/016469, Sep. 18, 2006 (mailing date), Apple Computer, Inc.
International Preliminary Report on Patentability for PCT/US2006/016469, Oct. 30, 2007 (issuance date), Apple Computer, Inc.
Portions of prosecution history of EP 06751923.1, Feb. 18, 2010 (mailing date), Apple Inc.
International Search Report and Written Opinion for PCT/US2006/016169, Oct. 16, 2008 (mailing date), Apple Computer, Inc.
International Preliminary Report on Patentability PCT/US2006/016169, Dec. 11, 2008 (mailing date), Apple Computer, Inc.
Triebel, Tonio, et al., "Peer-to-peer Voice Communication for Massively Multiplayer Online Games," $6^{th}$ IEEE International Conference on Consumer Communications and Networking, Jan. 10-13, 2009, pp. 1-5.
Wong, Chi-Wah, et al., "PID-based Real-time Rate Control," IEEE Conference on Multimedia and Expo (ICME), Jun. 27-30, 2004, pp. 221-224, vol. 1.
Zhanjun, Zhang, et al., "The Guarantee of QoS for Wireless Multimedia Streams Based on Adaptive Session," IEEE International Conference on Personal Wireless Communications, Dec. 17-20, 2000, pp. 283-287.
Updated portions of prosecution history of U.S. Appl. No. 11/118,932, Jun. 13, 2012, Abuan, Joe, et al.
Updated portions of prosecution history of U.S. Appl. No. 12/702,287, May 25, 2012, Pun, Thomas, et al.
First Office Action and transmittal letter in Japanese Patent Application No. 2011-264102, Mar. 11, 2013, pp. 1-4.

* cited by examiner

US 8,638,353 B2

VIDEO PROCESSING IN A MULTI-PARTICIPANT VIDEO CONFERENCE

CLAIM OF BENEFIT TO PRIOR APPLICATIONS

This Application is a divisional application of U.S. patent application Ser. No. 11/118,553, entitled "Video Processing in a Multi-Participant Video Conference," filed Apr. 28, 2005 now U.S. Pat. No. 7,817,180 which is incorporated herein by reference.

FIELD OF THE INVENTION

The present invention relates to video processing in a multi-participant video conference.

BACKGROUND OF THE INVENTION

With proliferation of general-purpose computers, there has been an increase in demand for performing video conferencing through personal or business computers. Establishing such a conference, however, creates significant challenges in how to transfer data between participants. Prior solutions require large amount of data to be exchanged, which consumes a lot of computing resources as well as a lot of bandwidth.

Due to these resources and bandwidth limitations, general-purpose computers that are readily available for use in home and offices have not been able to perform video conferencing effectively and inexpensively. Therefore, there is a need in the art for a video conferencing architecture that uses an efficient method for transmitting data between video-conference participants. Such an approach would allow the video conference to be conducted thru commonly available network connections.

SUMMARY OF THE INVENTION

Some embodiments provide an architecture for establishing multi-participant video conferences. This architecture has a central distributor that receives video images from two or more participants. From the received images, the central distributor generates composite images that the central distributor transmits back to the participants. Each composite image includes a set of sub images, where each sub image belongs to one participant. In some embodiments, the central distributor saves network bandwidth by removing each particular participant's image from the composite image that the central distributor sends to the particular participant. In some embodiments, images received from each participant are arranged in the composite in a non-interleaved manner. For instance, in some embodiments, the composite image includes at most one sub-image for each participant, and no two sub-images are interleaved.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide an architecture for establishing multi-participant video conferences. This architecture has a central distributor that receives video images from two or more participants. From the received images, the central distributor generates composite images that the central distributor transmits back to the participants. Each composite image includes a set of sub images, where each sub image belongs to one participant. In some embodiments, the central distributor saves network bandwidth by removing each particular participant's image from the composite image that the central distributor sends to the particular participant. In some embodiments, images received from each participant are arranged in the composite in a non-interleaved manner. For instance, in some embodiments, the composite image includes at most one sub-image for each participant, and no two sub-images are interleaved.

Several detailed embodiments of the invention are described below. In these embodiments, the central distributor is the computer of one of the participants of the video conference, and the images that are transmitted to and from the central distributor are video frames. One of ordinary skill in the art will realize that other embodiments are implemented differently. For instance, the central distributor in some embodiments is not the computer of any of the participants of the video conference. Also, in some embodiments, the images transmitted to and from the central distributor are not video frames (e.g., the images might be fields that comprise a frame, or some other video image representation).

I. Overview

Figure 1:
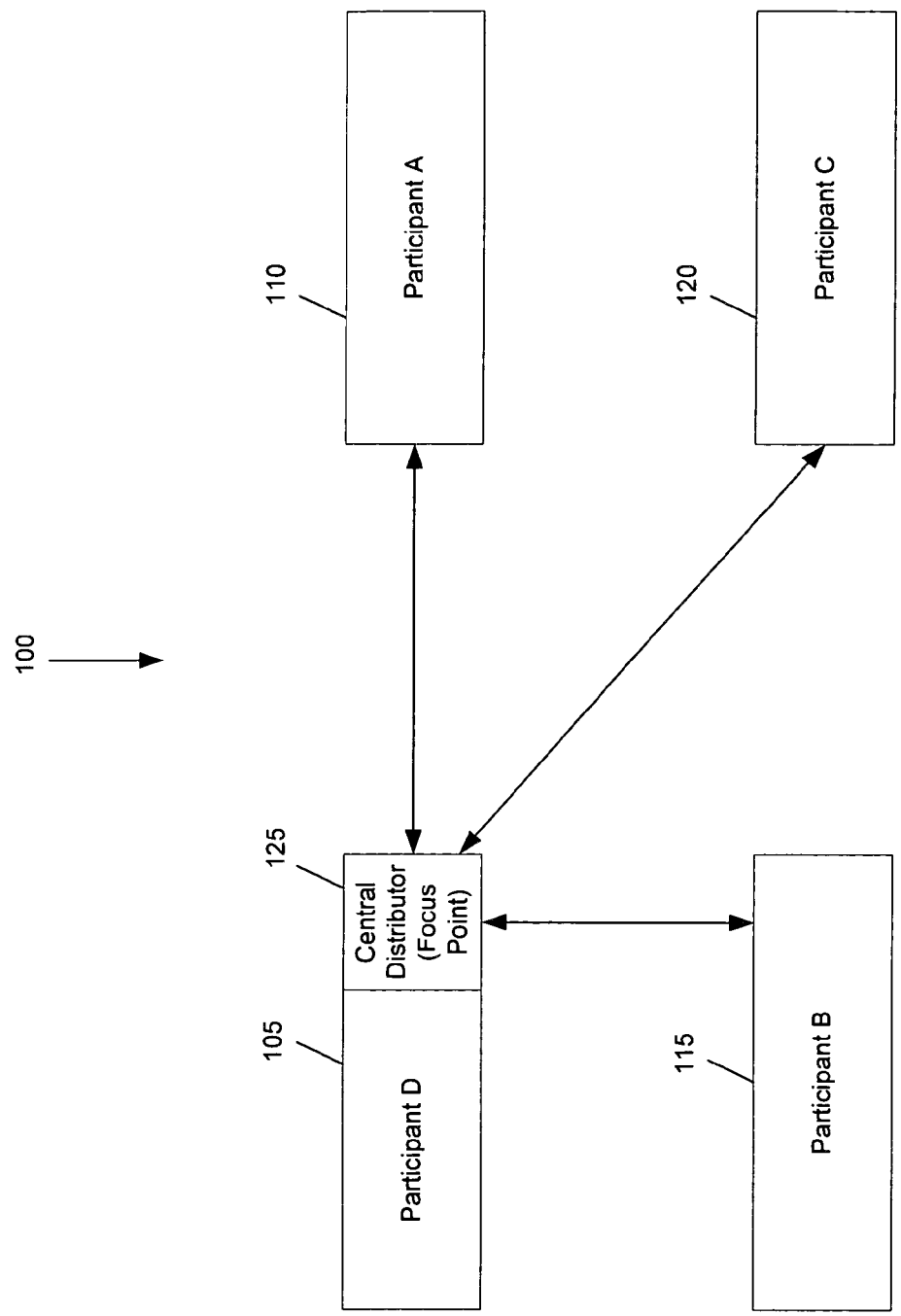
FIG. 1 illustrates an example of the video conference architecture of some embodiments of the invention.

FIG. 1 illustrates an example of the video conference architecture 100 of some embodiments of the invention. This architecture allows multiple participants to engage in a video conference. In the example illustrated in FIG. 1, four participants A, B, C, and D are engaged in the video conference through their four computers 105-120 and a network (not shown) that connects these computers. The network that connects these computers can be any network, such as a local area network, a wide area network, a network of networks (e.g., the Internet), etc.

During the video conference, the computer 105 of one of the participants (participant D in this example) serves as a central distributor of audio/video content, as shown in FIG. 1. This central distributor 125 will be referred to below as the focus point of the multi-participant conference. The computers of the other participants will be referred to below as non-focus machines or non-focus computers.

Also, the discussion below focuses on the video operations of the focus and non-focus computers. The audio operations of these computers are further described in U.S. Patent Application entitled "Audio Processing in a Multi-Participant Conference", filed concurrently with this application, with the Ser. No. 11/118,555. In addition, U.S. Patent Application entitled "Multi-Participant Conference Setup", filed concurrently with this application, with the Ser. No. 11/118,931, describes how some embodiments set up a multi-participant video conference through a focus-point architecture, such as the one illustrated in FIG. 1. Both these applications are incorporated herein by reference.

Figure 2:
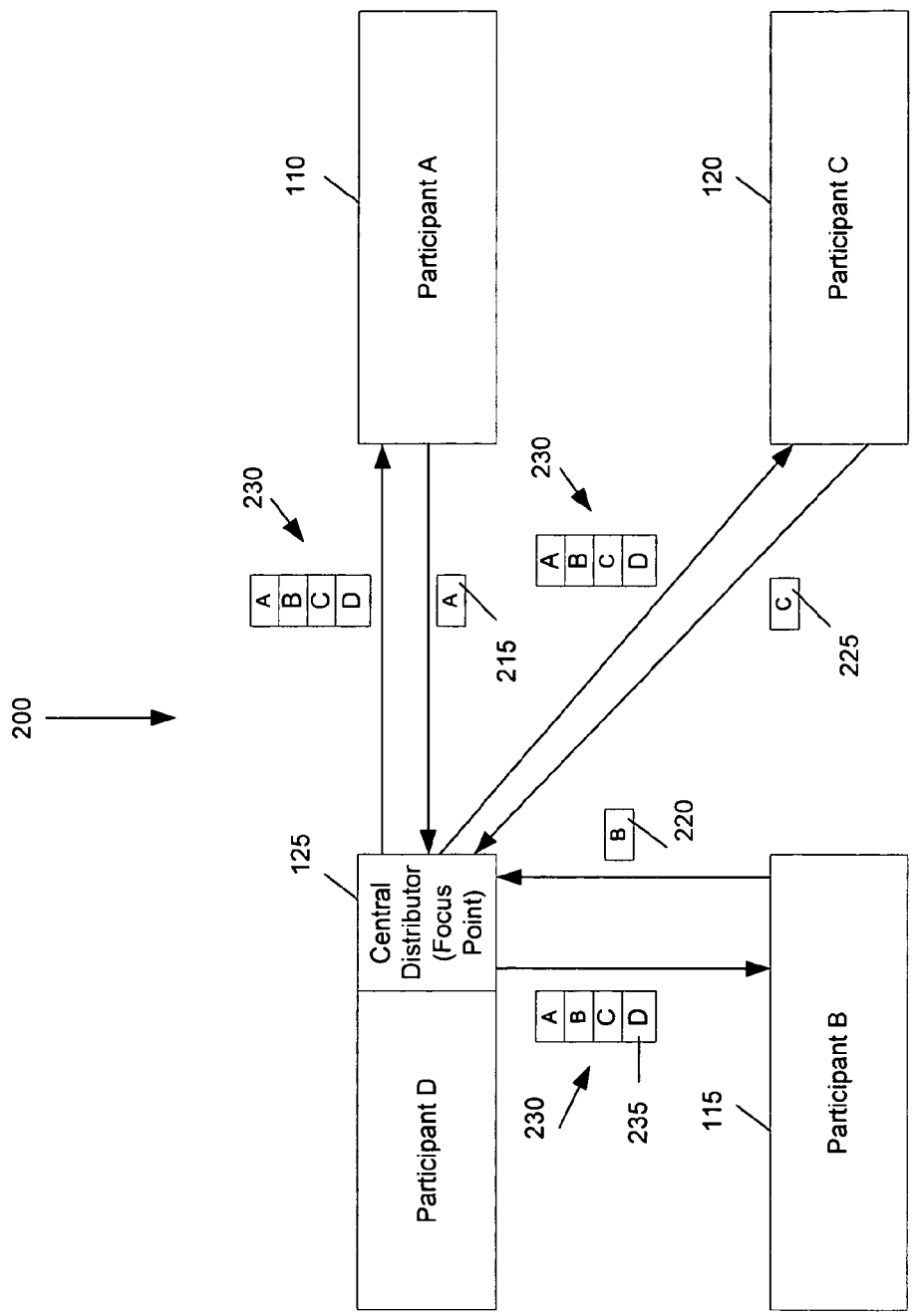
FIGS. 2 and 3 illustrate how some embodiments exchange video content in a multi-participant video conference.

As the central distributor of audio/video content, the focus point 125 receives video images from each participant, composites and encodes these images, and then transmits the composite images to each of the non-focus machines. FIG. 2 shows an example of such an image exchange for the four participant example of FIG. 1. Specifically, FIG. 2 illustrates the focus point 125 receiving one video frame 215-225 from each participant. From the received images 215-225, the focus point 125 generates a composite frame 230 that includes each of the received frames and a frame 235 of the focus-point participant D. The focus point 125 then transmits the composite frame 230 to each non-focus machine 110, 115, and 120.

In the example illustrated in FIG. 2, the composite frame 230 that is transmitted to each particular non-focus participant also includes the video frame of the particular non-focus participant. In some embodiments, however, the focus point removes a particular non-focus participant's image from the composite image that the focus point transmits to the particular non-focus participant. The focus point 125 removes each participant's own image from its corresponding composite image in order to save bandwidth.

Figure 3:
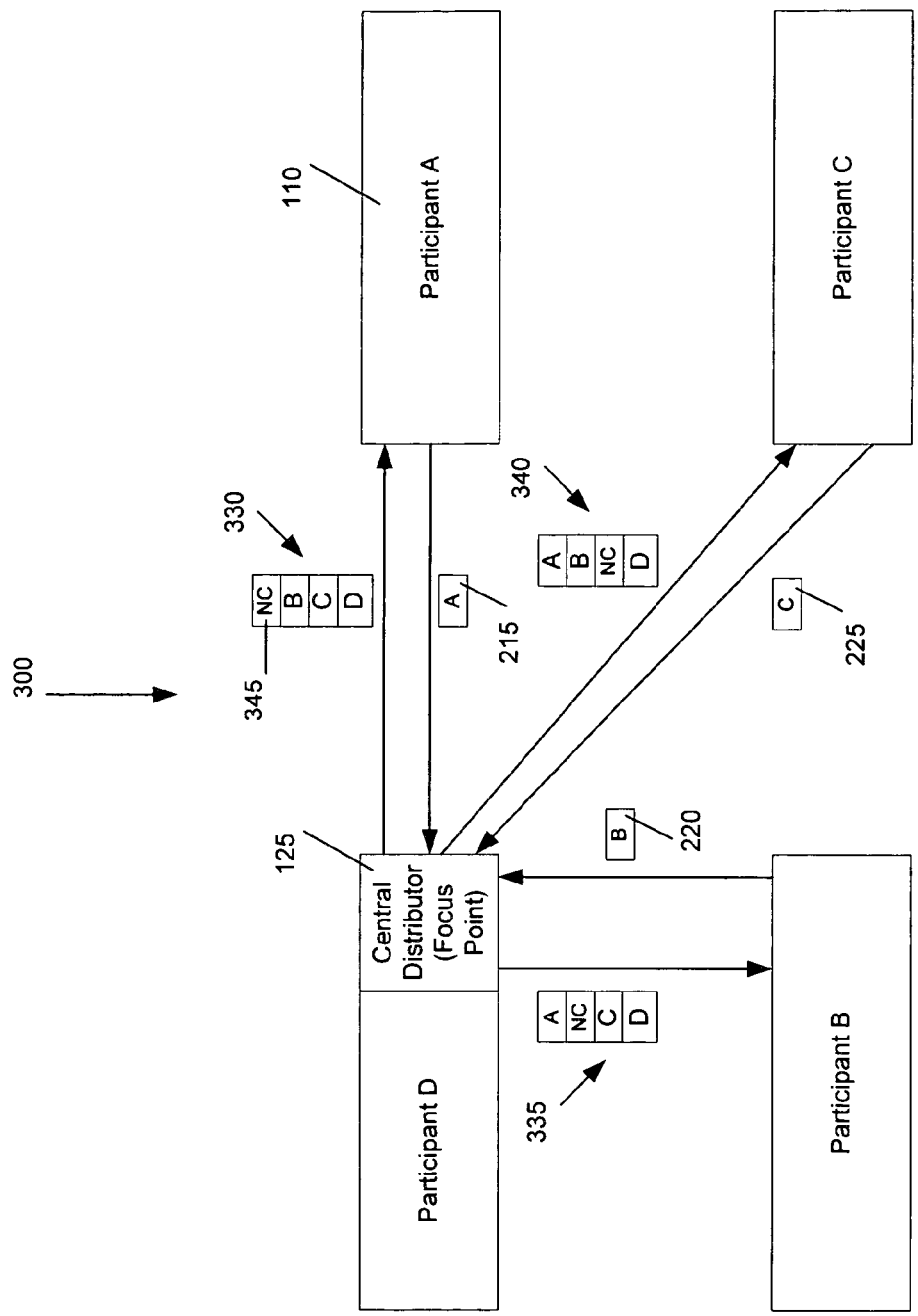

FIG. 3 illustrates an example of this removal for the example illustrated in FIG. 2. Specifically, FIG. 3 illustrates (1) for participant A, a composite image 330 that does not have participant A's own image 215, (2) for participant B, a composite image 335 that does not have participant B's own image 220, and (3) for participant C, a composite image 340 that does not have participant C's own image 225.

FIG. 3 also illustrates that instead of a non-focus participant's own image, some embodiments insert an empty-field flag 345 in the location of the non-focus participant's image in the composite image 330. This flag indicates the absence of the sub-image corresponding to the non-participant's own image. Since the size of this indicator 345 is much smaller than the size of non-focus participant's image, the removal of a particular non-focus participant's image from this participant's composite image reduces the amount of bandwidth used by the composite image. Some embodiments do not use the empty-field flag 345, and instead simply remove the image of a particular non-focus participant from the composite image sent to the particular non-focus participant. For instance, in some embodiments, the non-focus point module's decoder determines how the video image is composed with remaining encoded sub images because each encoded macroblock in each image has an identifier that represents its location.

Figure 4:
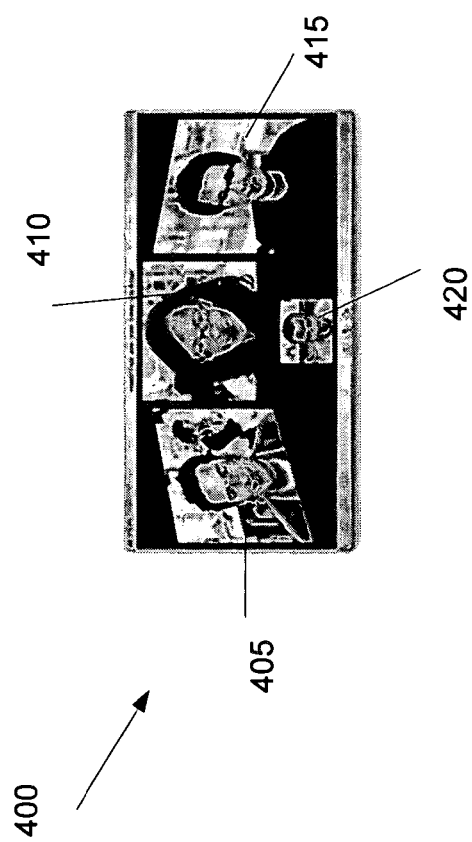
FIG. 4 shows an exemplary arrangement of participants' images on one of the participants' display.

Once each non-focus machine receives its encoded composite image, the non-focus machine decodes the composite image, extracts each of the sub-images in the composite image and then displays the decoded, extracted images on its display. FIG. 4 illustrates an example of such a display for the case of four participants in a video conference. As shown in FIG. 4, the images 405-415 of the three other participants are displayed horizontally on the participant's computer display 400. The local participant's own image 420 is displayed with a smaller size relative to the other participants' images 405-415 and is located on the bottom of the display 400.

Figure 5:
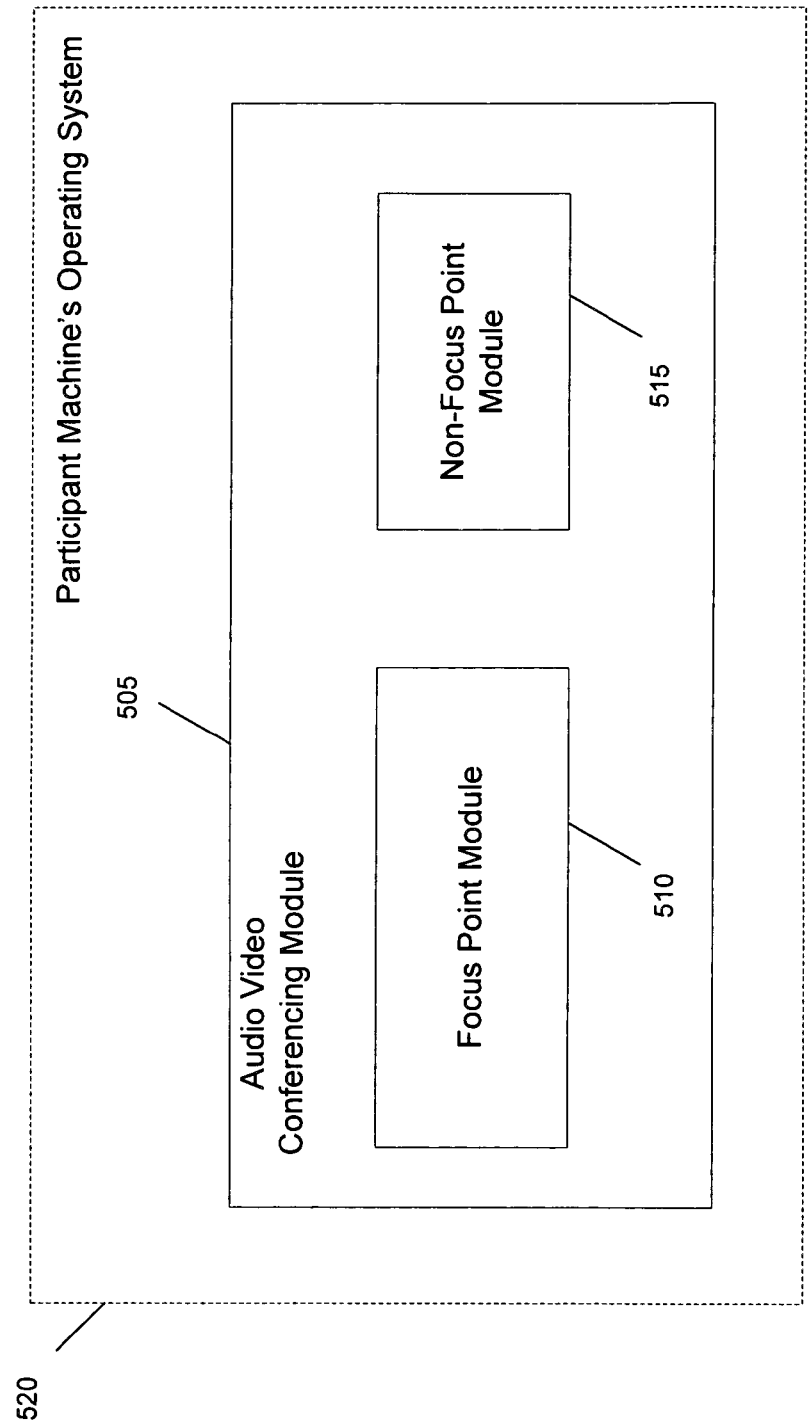
FIG. 5 shows the software components of the video conferencing application of some embodiments of the invention.

Some embodiments are implemented by a video conference application that can perform both focus and non-focus point operations. FIG. 5 illustrates the software architecture for one such application. Specifically, this figure illustrates a video conference application 505 that has two modules, a focus-point module 510 and a non-focus point module 515. Both these modules 510 and 515, and the video conference application 505, run on top of an operating system 520 of a video-conference participant's computer.

During a multi-participant video conference, the video conference application 505 uses the focus-point module 510 when this application is serving as the focus point of the conference, or uses the non-focus point module when it is not serving as the focus point. The focus-point module 510 performs focus-point video-processing operations when the video conference application 505 is the focus point of a multi-participant video conference. On the other hand, the non-focus point module 515 performs non-focus point, video-processing operations when the application 505 is not the focus point of the conference. In some embodiments, the focus and non-focus point modules 510 and 515 share certain resources.

The focus-point module 510 is described in Section II of this document, while the non-focus-point module 515 is described in Section III.

II. the Focus-Point Module

Figure 6:
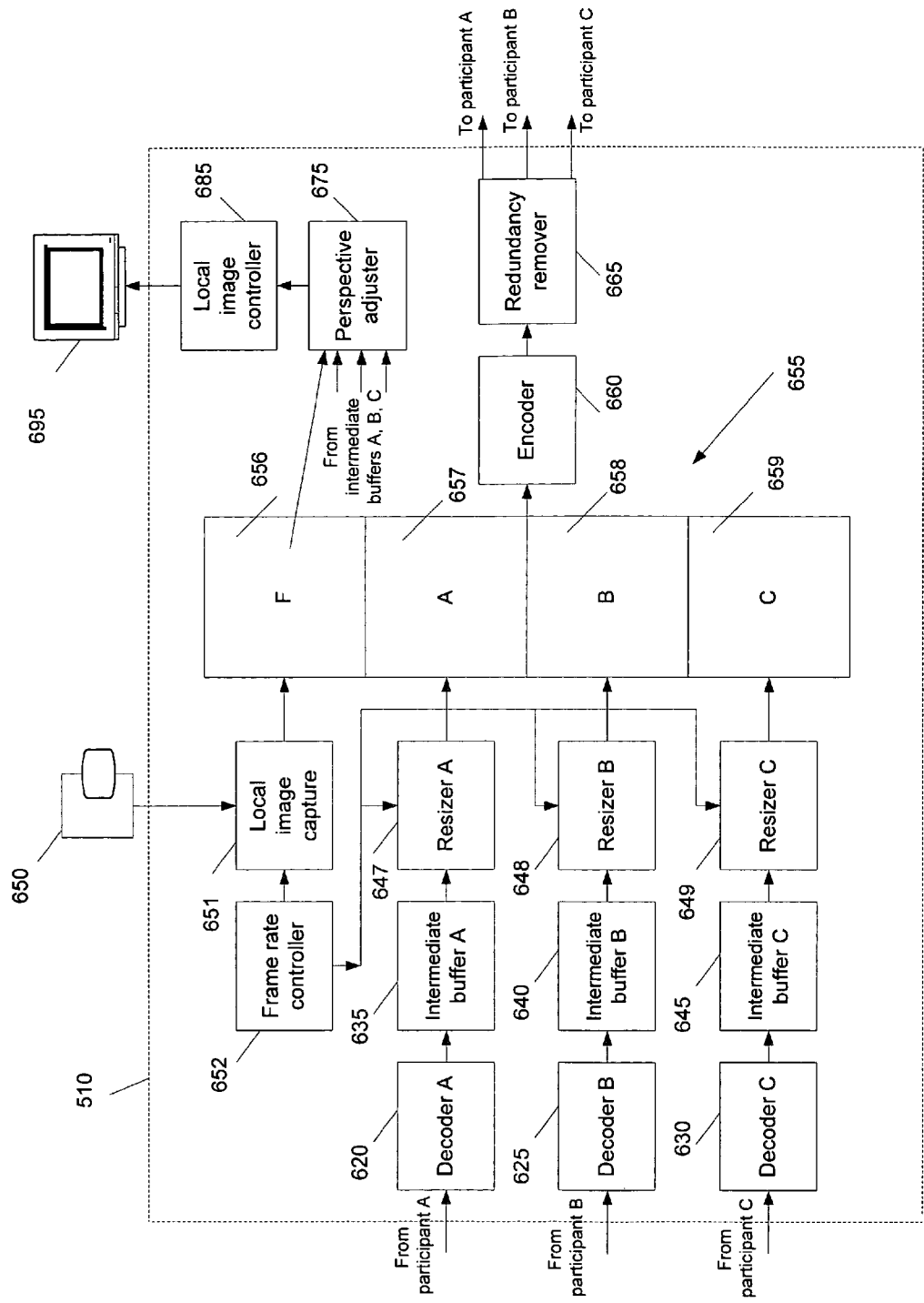
FIG. 6 illustrates the focus-point module of some embodiments of the invention.

FIG. 6 illustrates the focus-point module 510 of some embodiments of the invention. In this example, the focus-point module 510 is shown during a video conferencing with four participants, three non-focus participants and one focus participant. Specifically, FIG. 6 shows focus-point module 510 as utilizing three decoders 620-630, three intermediate buffers 635-645, three resizers 647-649, a local image capture module 651, a frame rate controller 652, a composite image buffer 655, an encoder 660, a redundancy remover 665, a perspective adjuster 675, and a local image controller 685.

The decoders 620-630, the intermediate buffers 635-645, and the resizers 647-649 form three video decoding pipelines into three sections 657-659 of the composite image buffer 655. These three video decoding pipelines allow the focus-point module 510 to decode and composite video signals from up to three participants during a video conference.

Specifically, each decoder 620, 625, or 630 is responsible for decoding video signals from one non-focus computer during a video conference. For the example illustrated in FIG. 1, FIG. 6 illustrates the decoder 620 receiving video signals from participant A's computer, the decoder 625 receiving video signals from participant B's computer, and the decoder 630 receiving video signals from participant C's computer.

After decoding a received frame, each decoder 620, 625, or 630 stores the decoded frame in an intermediate buffer 635, 640, or 645. In some embodiments, each intermediate buffer is a location in the memory of the focus-point computer.

At a particular frame sampling rate, each resizer 647, 648, or 649 (1) retrieves a frame that is stored in its corresponding intermediate buffer, (2) resizes this frame, if such resizing is necessary, and (3) stores the frame in its corresponding section in the composite image buffer 655. For instance, the resizer 648 retrieves a decoded frame of the participant B from the intermediate buffer 640, resizes this retrieved frame if necessary, and stores this frame in the composite-buffer section 658.

The frame rate controller 652 defines the frame sampling rate at which the resizers 647-649 retrieve frames from the intermediate buffers 635-645. The frame rate controller 652 determines this rate based on a variety of factors, which may include the system bandwidth, the computational resources of the focus-point computer, the number of participants in the video conference, etc. At the frame sampling rate that the controller 652 supplies to the resizers 647-649, the frame rate controller 652 also directs the local image capture module 651 to store frames in section 656 of the composite image buffer 655. These stored frames are the images of the video-conference participant who is using the focus-point computer during the video conference. These images are captured by the camera 650 and the local image capture module 651 at the focus-point computer. In some embodiments, the frame rate controller 652 changes the particular frame rate during a video conference, as the conditions of the video conference change.

As mentioned above, the resizers 647-649 retrieve frames from the buffers 635-645 based on the frame rate they receive from the controller 652. Before storing a retrieved frame in the composite image buffer, a resizer resizes the retrieved frame when the non-focus computer that supplied this frame supplied it at a different size than the size of the composite-buffer section for this frame. For instance, to save bandwidth or computational resources during the encoding, a non-focus computer might encode and transmit smaller frames (i.e., encode frames at coarser level of granularity and transmit packets with less encoded content for each frame).

Also, as mentioned above, the resizers 647-649 store potentially-resized frames in their corresponding sections 657-659 of the composite image buffer 655. In some embodiments, the composite image buffer 655 is a location in the memory of the focus-point computer, and each section 656-659 in this buffer is a contiguous logical section at this location in the memory.

At the sampling rate that the controller 652 defines, the encoder 660 encodes the composite frame that is stored in the composite image buffer. The encoder encodes the sub-frame that is stored in each section 656, 657, 658, or 659 independently of the sub-frames that are stored in the other sections of the composite image buffer 655.

Figure 7:
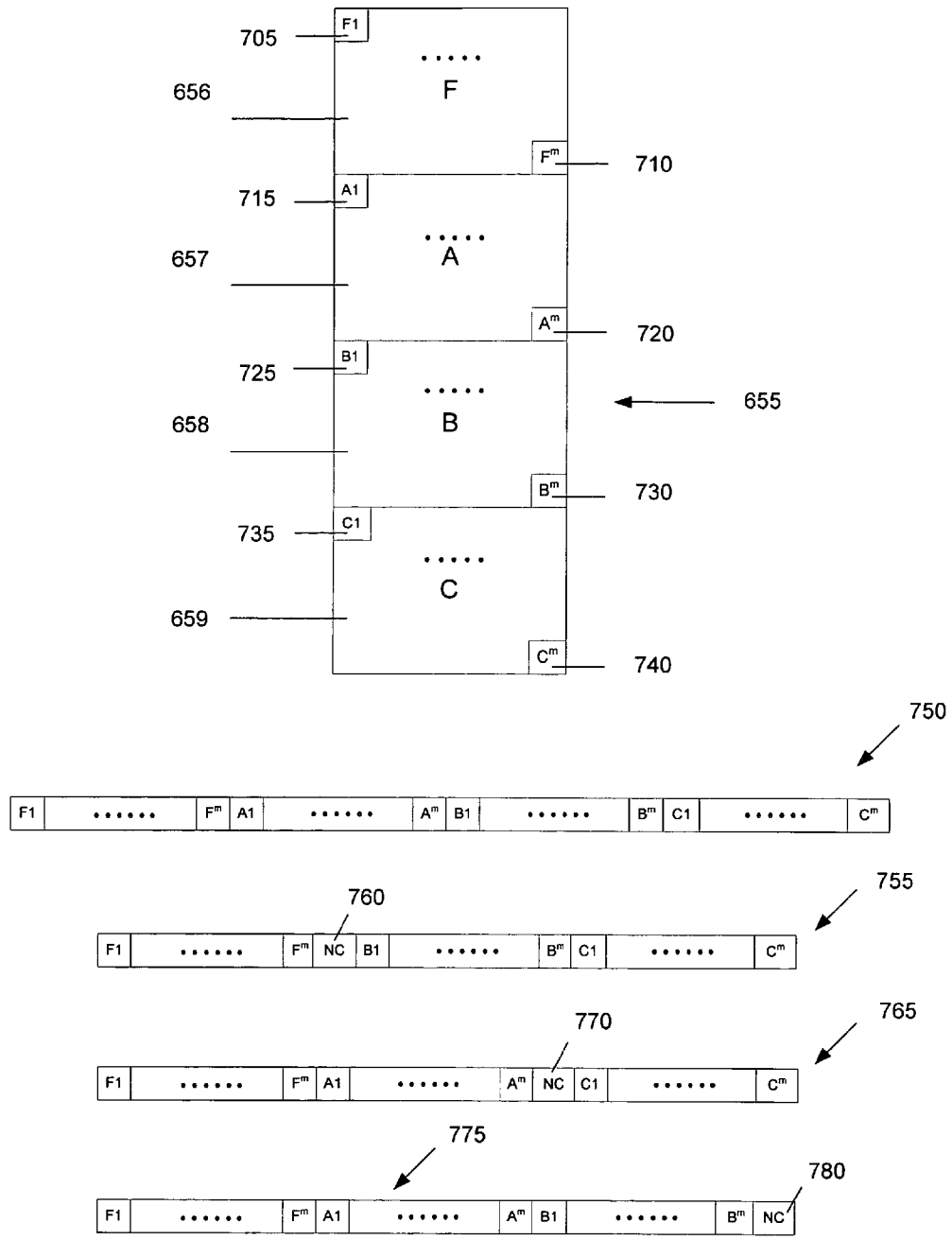
FIG. 7 shows the composite video data and video streams that the focus-point module of some embodiments produces.

To illustrate this, FIG. 7 presents a diagram that summarizes the encoding of a composite frame. Specifically, this figure illustrates the four sections 656-659 of the composite image buffer 655. For the encoding, the sub-frames in the section 656-59 are divided into sets of pixels. For instance, in some embodiments, each sub-frame is divided into a set of macroblocks, which are then intra-encoded without reference to any other frame's macroblock, or are inter-encoded by reference to another frame's macroblock. FIG. 7 illustrates the dividing of the sub-frame in section 656 into several macroblocks 705-710, the dividing of the sub-frame in section 657 into several macroblocks 715-720, the dividing of the sub-frame in section 658 into several macroblocks 725-730, and the dividing of the sub-frame in section 659 into several macroblocks 735-740.

As indicated above, the encoder 660 decouples the encoding of each sub-frame in each section 656, 657, 658, or 659 so that the encoding of each sub-frame does not depend on any other sub-frame (i.e., the encoding of one section does not use video data beyond the boundaries of each section). For example, the encoding of the macroblocks in the sub-frame of participant A in section 657 does not depend on the encoding of the macroblocks in the sub-frame of participant B in the section 658. This encoding is further described in U.S. Patent Applications entitled "Video Encoding in a video Conference", filed concurrently with the present application, with the Ser. No. 11/118,615. This application is incorporated in the present application by reference.

After encoding a composite frame, the encoder 660 supplies the redundancy remover with an encoded video stream that contains each participant's encoded video data in a separate section (i.e., contains different participants encoded video data in separate, non-interleaved sections). For instance, FIG. 7 illustrates an encoded video stream 750 that includes encoding data for each intra-encoded or inter-encoded macroblock of the composite frame. In this composite stream 750, the encoded data for each sub-frame is not interleaved with the encoded data of any other sub-frame, as shown in FIG. 7.

This non-interleaved structure of the encoded stream allows the redundancy remover to remove quickly a particular non-focus participant's video data from the video stream that is to be transmitted to the particular non-focus participant. For instance, FIG. 7 illustrates (1) for participant A, a video stream 755 that has participant A's encoded video data replaced with a empty-field flag 760, (2) for participant B, a video stream 765 that has participant B's encoded video data replaced with a empty-field flag 770, and (3) for participant C, a video stream 775 that has participant A's encoded video data replaced with a empty-field flag 780. As mentioned above, some embodiments do not employ such empty-field flags, and instead rely on the non-focus module decoders to automatically identify the empty sub-frames.

Once the redundancy remover removes each participant's redundant image data from the participant's video stream, the redundancy remover transmits the participant's video stream to the participant. Accordingly, FIG. 6 illustrates the redundancy remover 665 sending three video streams to the three non-focus participants A, B. and C.

FIG. 6 also illustrates that the perspective adjuster 675 of the focus-point module 510 retrieves the focus point participant's image from focus point sub image 656 in the composite image buffer 655. The perspective adjuster 675 also retrieves non-focus participants sub images from the intermediate buffers 635, 640, and 645. The adjuster 675 adjusts each non-focus participant's sub-frame in the composite image for the perspective view illustrated in FIG. 4. It then supplies the adjusted composite frame to the local image controller, which then renders the final composite image for display on the display device 695 of the focus-point computer.

Figure 8:
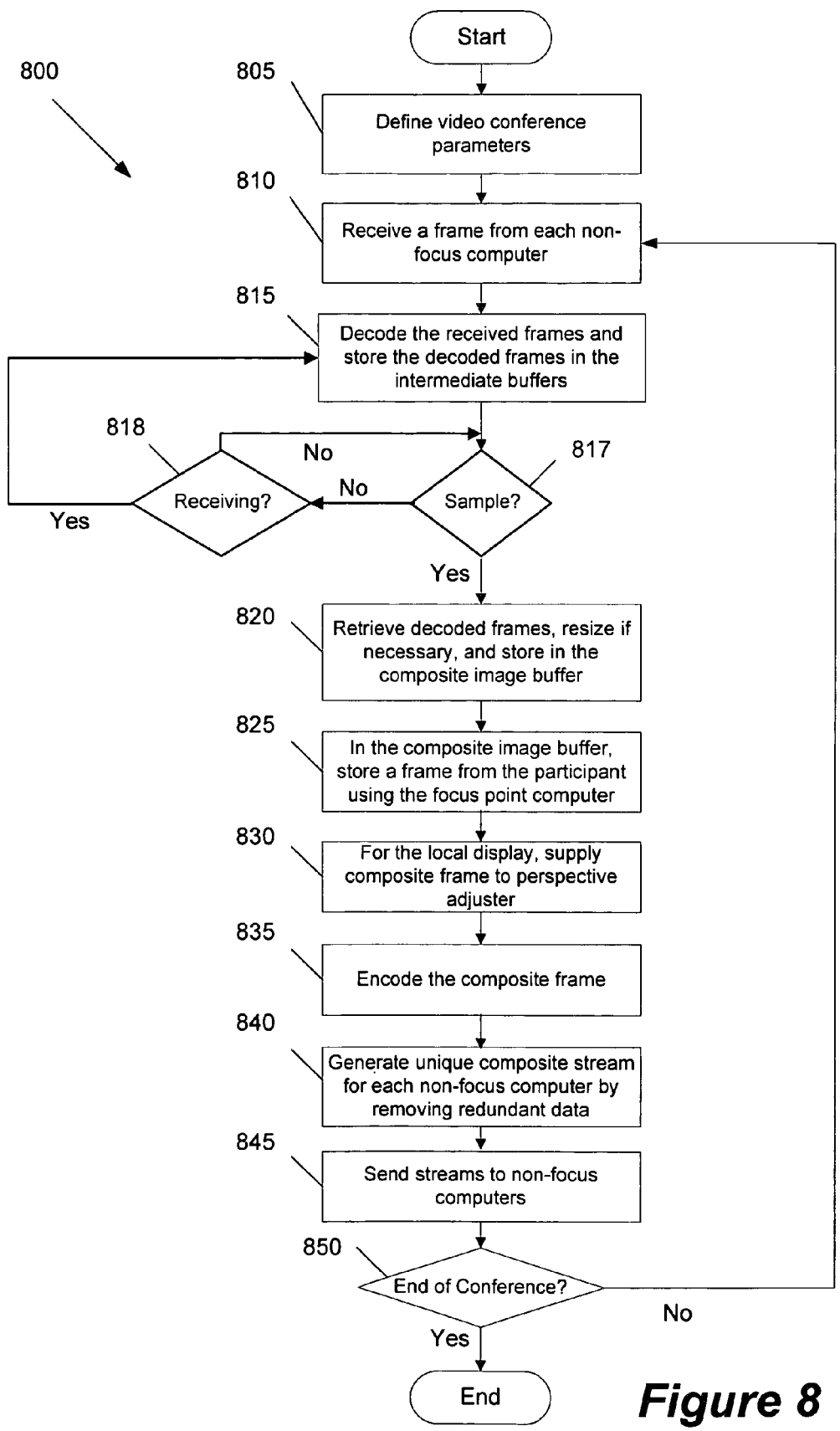
FIG. 8 is a flow chart showing focus point video processing of some of the embodiments.

During a video conference, each of the components of the focus-point module 510 iteratively performs the above-described operations. FIG. 8 presents a process 800 that conceptually shows these iterative operations of the focus-point module 510 in some embodiments. In some embodiments, the focus-point module 510 performs this process 800 for a video conference with n participants, where n can be any number more than two.

As shown in FIG. 8, the focus-point process 800 initially defines (at 805) one or more parameters relating to the video conference. Different embodiments define different parameters at 805. Examples of such parameters include the type of encoding used by the encoder of each non-focus computer, the size of frames transmitted by each non-focus computer, the type of encoding used by the focus-point computer, the size of the composite image buffer, etc. The above-incorporated U.S. Patent Application entitled "Multi-Participant Conference Setup", describes how these parameters are set and possibly reset during a video conference.

Next, the focus-point module receives (at 810) a frame from each non-focus computer. A decoder (e.g., a decoder 620, 625, or 630) of the focus-point module 510 then decodes (at 815) the received frame and stores the received frame in an intermediate image buffer (e.g., a buffer 635, 640, or 645). To decode frames from a particular non-focus computer, a decoder uses decoding algorithms that are appropriate for the encoding that the particular non-focus computer uses. These encoding and/or decoding algorithms are specified during the initialization operation 805 of the process 800. In some embodiments, these algorithms might be re-specified during a video conference as the conditions of the video conference change (e.g., as new participants join or leave the video conference), as mentioned in the above-incorporated application.

After 815, the focus-point module 510 determines (at 817) whether it is time for the resizers to sample the intermediate buffers (i.e., to retrieve decoded frames from the intermediate buffers, e.g., buffers 635-645 in case of three non-focus participants). As mentioned above, the sampling rate is set by the frame rate controller 652.

When the process 800 determines (at 817) that it is not time for the resizers to sample the intermediate buffers, the process transitions to 818. At 818, the process determines whether any new frame has been received from a non-focus participant. If so, the process transitions to 815 to decode the received frame and store the decoded frame in the appropriate intermediate image buffer. On the other hand, when the process determines (at 818) that it is not receiving any frame, it transitions back to 817, to determine whether it is time for the resizers to sample the intermediate buffers.

When the process determines (at 817) that it is time for the resizers to sample the intermediate buffers, the resizers (e.g., resizers 647-649) retrieve (at 820) decoded frames from the intermediate buffers (e.g., buffers 635-645), resize these retrieved frames if necessary, and store these frames in the composite image buffer 655.

Next, at 825, the local image capture 651 stores in composite-buffer section 656 a frame that the camera 650 captures of the participant that is using the focus-point computer. At 830, the focus point sub image 656 from the composite image buffer and non-focus participants' sub images from the intermediate buffers 635, 640, and 645 are supplied to the perspective adjuster 675, which then adjusts each non-focus participant's sub-frame in the composite image for the perspective view illustrated in FIG. 4. The adjuster 675 supplies the adjusted composite frame to the local image controller, which then renders the final composite image for display on the display device 695 of the focus-point computer.

The composite frame is also supplied (at 835) to the encoder 660, which encodes each sub-frame in the composite image independently of the other sub-frames. The redundancy remover 665 then generates (at 840) a video stream for each non-focus participant by removing the non-focus participant's video content from the encoded video stream produced by the encoder. The redundancy remover transmits (at 845) each participant's video stream to the participant. After 845, the focus-point process 800 determines (at 850) whether the multi-participant video conference has terminated. If so, the process 800 terminates. Otherwise, the process transitions back to 810 to receive another frame.

As mentioned above, FIG. 8 is a conceptual illustration of the focus point's decoding and encoding operations in some embodiments. In some embodiments, the focus point module performs one or more decoding and encoding operations concurrently and independently in a multi-threaded processing scheme.

Figure 9:
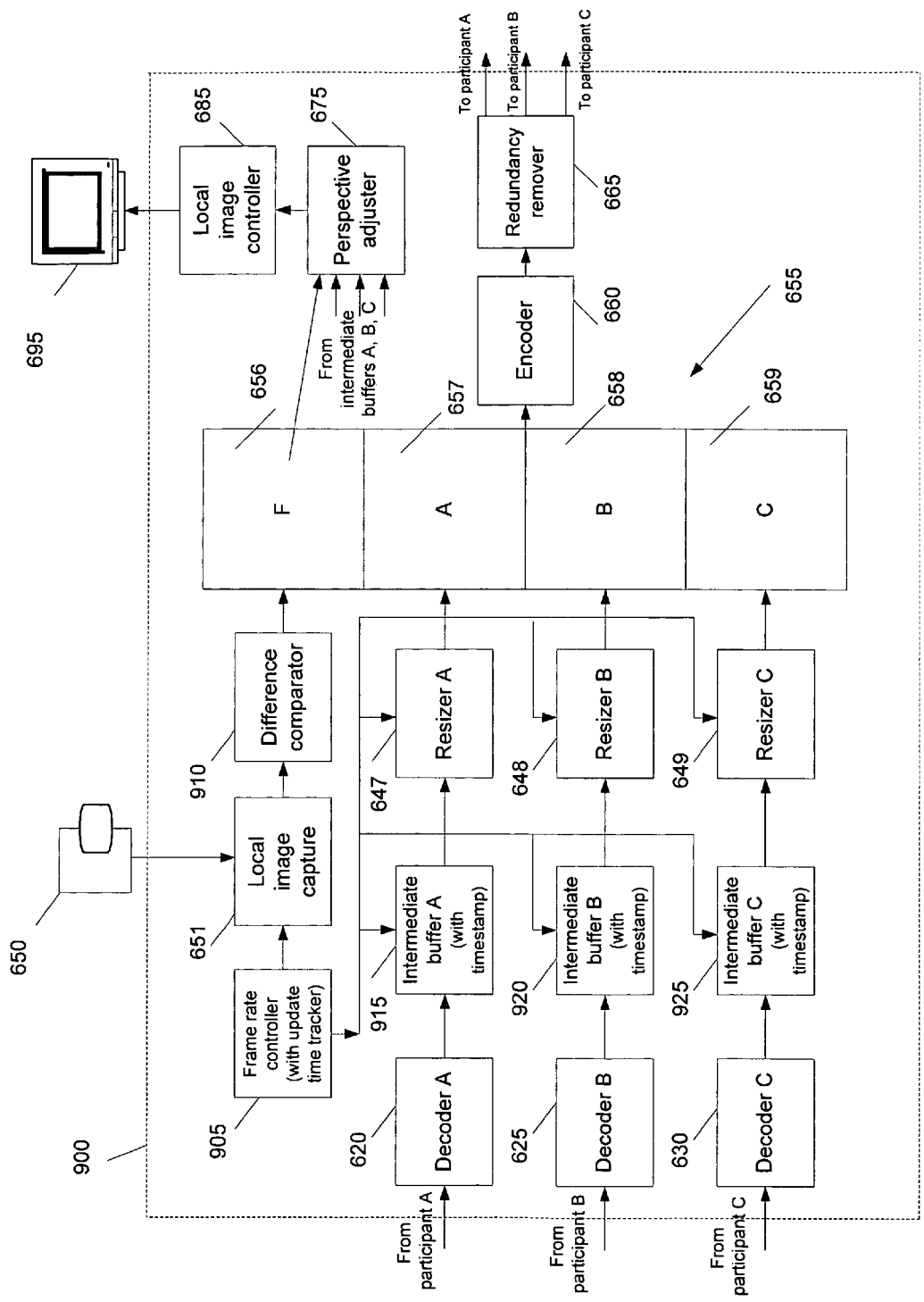
FIG. 9 illustrates the focus-point module with difference comparator in some embodiments of the invention.

Also, in some embodiments, the focus point module includes other software modules. For instance, FIG. 9 illustrates an alternative implementation of the focus point module. This implementation is similar to the implementation illustrated in FIG. 6, except that the focus point module 900 (1) has a frame rate controller with update time tracker 905, (2) a difference comparator 910, and (3) intermediate buffers 915-925 with timestamp fields.

The additional features of the frame rate controller and the intermediate buffer allow the focus-point module to avoid encoding the same frame from a non-focus point computer more than once. Specifically, when one of the decoders 620-630 writes a new frame into one of the intermediate buffers 915-925, the decoder records the time in the timestamp field of the intermediate buffer.

At a particular frame rate, the frame rate controller 905 checks the timestamp field of each intermediate buffer. If the frame rate controller detects that an intermediate buffer's timestamp is later than the previous time that this buffer's content was supplied to its corresponding resizer, the frame rate controller directs the buffer's corresponding resizer to retrieve the buffer's content. Alternatively, when the frame rate controller detects no difference between the buffer's timestamp and the last time that the buffer was read by its corresponding resizer, the frame controller forgoes calling the resizer to read the content of the buffer. This is because in this case the intermediate buffer has not received any new frames since the last time that it was read by its corresponding resizer. Foregoing read out of the same frame multiple times eliminates unnecessary encoding of duplicate frames, and thereby save computational and bandwidth resources of the computers involved in the video conference.

Figure 10:
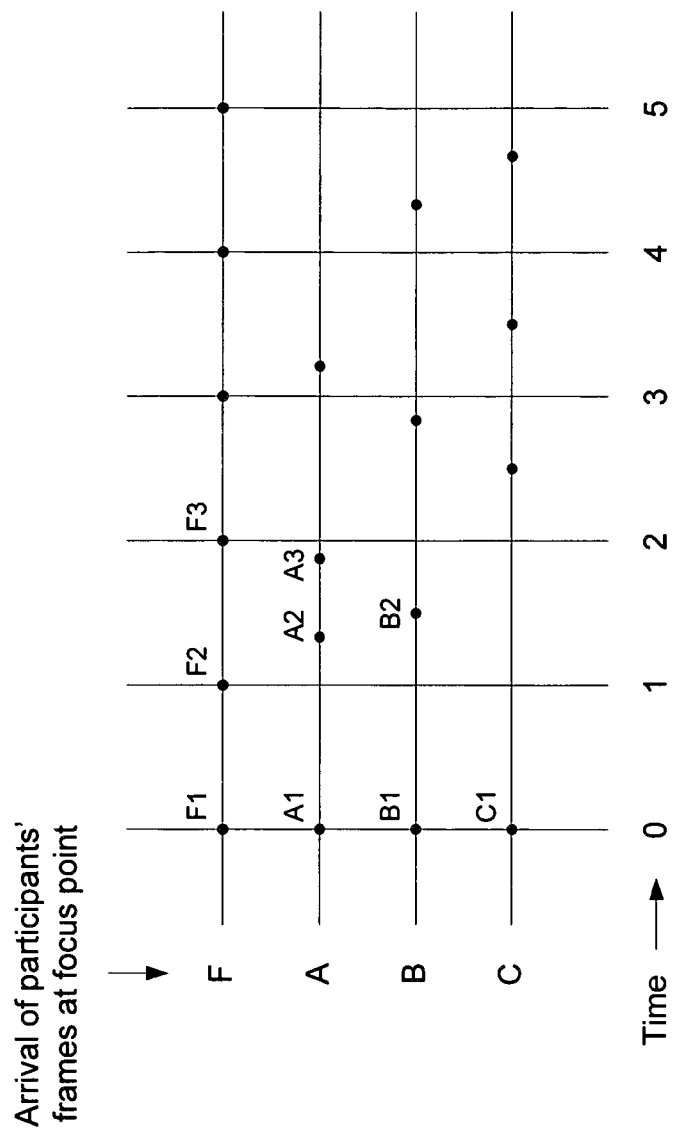
FIG. 10 is an example of new frames arriving at different times at the focus point encoder.

To illustrate this benefit, FIG. 10 presents an example where delays in signal transmission between the focus and non-focus computers cause the focus point computer to skip the encoding of certain duplicate frames. Specifically, this figure illustrates the storage of frames in intermediate buffers 915-925 of the focus point module. In this figure, passage of time is shown from left to right, while the storage of each participant's frame in a focus-point intermediate buffer is shown by dots placed on the horizontal lines.

For example, at time 0, the focus-point intermediate buffers have new frames from the focus point and all non-focus participants. These frames are labeled as F1, A1, B1, and C1 in FIG. 10. Each of these frames is encoded and transmitted to the non-focus participants. By time 1, the only new frame that is stored is the focus participant's image, which is identified as frame F2 in FIG. 10. The focus-point module, therefore, skips the retrieval and the encoding of the non-focus point participants' frames since they have not changed since time 0.

Between times 1 and 2, the focus-point computer receives one new frame from the focus point camera, two new frames from the participant A, and one new frame from the participant B. The newly arrived frames are identified as frames F3, A2, A3, and B2 respectively in FIG. 10. Hence, by time 2, the focus-point module stores frames F3, A3, and B2 as sub-frames in the composite image buffer, and then encodes and transmits composite images based on these stored sub-frames. In this case, frame A2 is lost to the other participants in the conference as it was overwritten in the intermediate buffer before it could be retrieved by the focus-point module. Also, at time 2, the resizer 649 (for participant C's data) does not retrieve the content of the intermediate buffer 925 since the content of this buffer at time 2 has not change from time 0, which was the last time that this intermediate buffer 925 was read by the resizer 649.

Due to a variety of reasons, the camera 650 at the focus-point computer might produce identical frames during two or more successive instances when the local image capture module 651 receives frames from it. Accordingly, to avoid duplicate processing of images of the local focus-point participant D, the focus-point module 900 utilizes the difference comparator 910. Specifically, at a particular frame rate, the frame rate controller 905 directs the local image capture 651 to capture a frame from the local camera 650. The local image capture module 651 of FIG. 9 supplies the captured frame to difference comparator 910, unlike the capture module 651 of FIG. 6, which would directly store this frame in the section 656 of the composite image buffer 655. The difference comparator 910 then stores the received frame in section 656 of the composite image buffer so long as it determines that the last frame it stored in this section was not identical or very similar to the received frame. In some embodiments, the difference comparator 910 computes a metric that expresses the difference between the received frame and the last frame that the comparator stored in the composite image buffer. If this metric is lower than a particular threshold, the comparator 910 will detect that the received frame is identical or very similar to the last frame that it stored in the composite image buffer.

If the comparator determines that the received frame is identical or very similar to the last frame it stored in the composite image buffer, it discards the received frame, in order to conserve the computational and bandwidth resources of the computers involved in the video conference. Otherwise, the comparator stores the received frame in section 656 of the composite image buffer and maintains a copy of this frame for its difference comparison the next time that it receives a frame from the local image capture.

As mentioned above, the update tracking of the frame rate controller and the difference comparison of the comparator 910 may cause one or more sections of the composite image buffer 655 to be empty at a particular time that the focus-point module 900 is generating and encoding composite frames. Accordingly, the composite frames that are generated at such instances by the focus-point module will have one or more empty sub-frames. Such empty sub-frames may be identified by flags, or may be automatically identified by the decoders of the non-focus computers, as mentioned above.

Avoiding processing and encoding of duplicate frames is useful in many contexts other than a multi-participant video conference. For instance, in peer-to-peer video conferences, it is useful for avoiding duplicate decoding of a frame from the other participant, or duplicate encoding of a frame that is locally captured.

Figure 11:
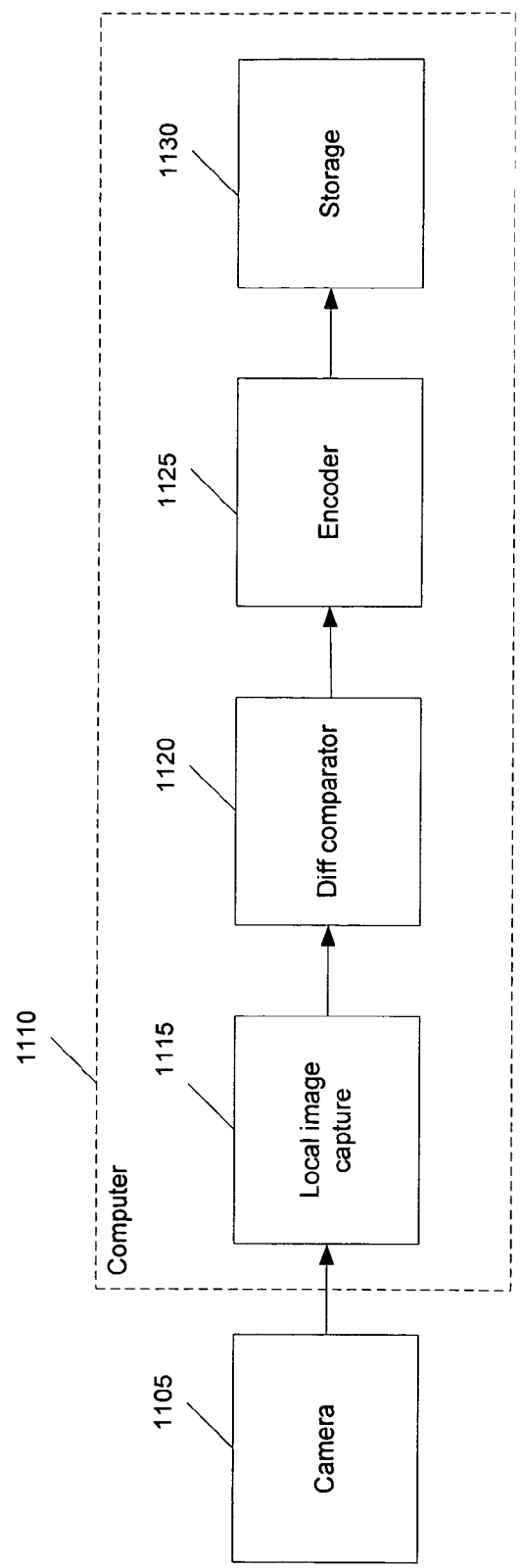
FIG. 11 illustrates the application of avoiding redundant frames in a non-video conference application.

Avoiding duplicate processing and encoding is also useful in on-video conference settings. FIG. 11 illustrates one such setting. Specifically, this figure illustrates a case where a computer 1100 captures frames from a camera, encodes these frames, and then locally stores these frames. As shown in this figure, the computer 1100 has a local capture module that captures frames from a video camera 1105 at a particular rate. Due to a variety of reasons, the camera 1105 might produce identical frames during two or more successive instances when the local image capture module 1115 receives frames from it.

The local image capture module 1115 supplies each captured frame to the difference comparator 1120, which then may or may not forward the captured frame to the encoder 1125. In particular, the comparator 1120 compares the frame that it receives from the capture module 1115 with the last frame that the comparator supplied to the encoder 1125. If the two frames are identical or very similar, the difference comparator foregoes supplying the received frame to the encoder. Alternatively, when the two frames are not identical or very similar, the difference comparator forwards the received frame to the encoder for encoding. The encoder encodes any frames that it receives and then stores them on the storage, which could be computer memory, hard disk, DVD, or similar media.

III. Non-Focus Point Module

Figure 12:
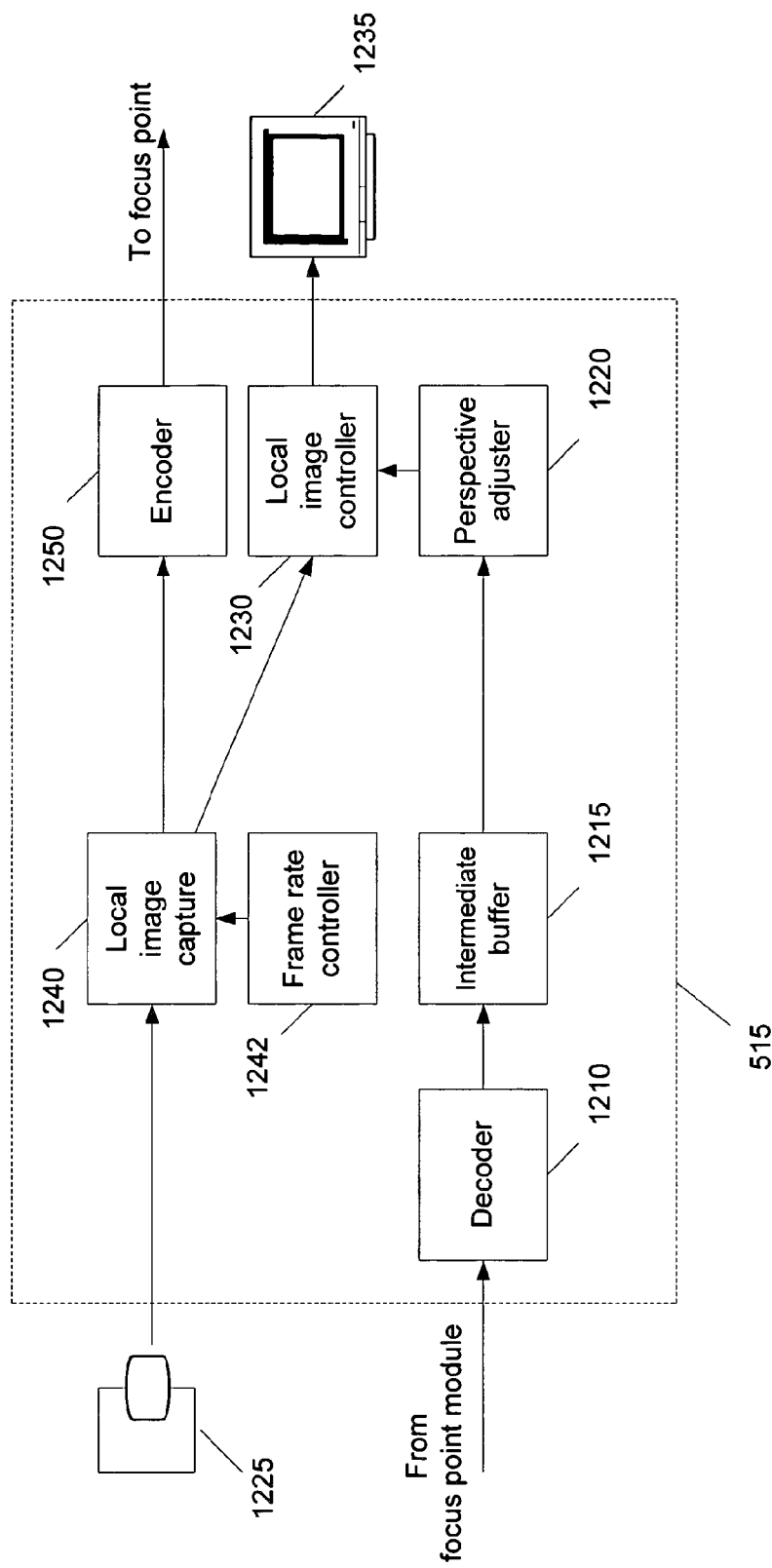
FIG. 12 illustrates the non-focus point module of some embodiments.

FIG. 12 illustrates the non-focus point module 515 of some embodiments of the invention. The non-focus point module performs encoding and decoding operations. For its encoding operation, the non-focus point module 515 utilizes a local image capture module 1240, a frame rate controller 1242, and an encoder 1250. For its decoding operation, the non-focus point module 515 utilizes a decoder 1210, an intermediate buffer 1215, a perspective adjuster 1220, and a local image controller 1230.

During the video conference, a camera 1225 attached to the non-focus computer films the video-conference participant who is using the non-focus point computer. During the encoding operation, the local image capture module 1240 receives and captures video frames that are produced by the camera. At a particular sampling rate that is specified by the frame rate controller 1242, the local image capture module 1240 directs the captured frames to the encoder 1250, which then encodes and transmits the frames to focus-point computer. In some embodiments, the frame rate controller 1242 changes the particular frame rate during a video conference as the conditions of the video conference change.

During its decoding operation, the non-focus module 515 receives composite frames from the focus point module 510 and decodes them for display on the display device 1235 of the non-focus computer. This decoding operation is further described by reference to FIG. 13, which conceptually illustrates a decoding process 1300 of the non-focus point module.

Figure 13:
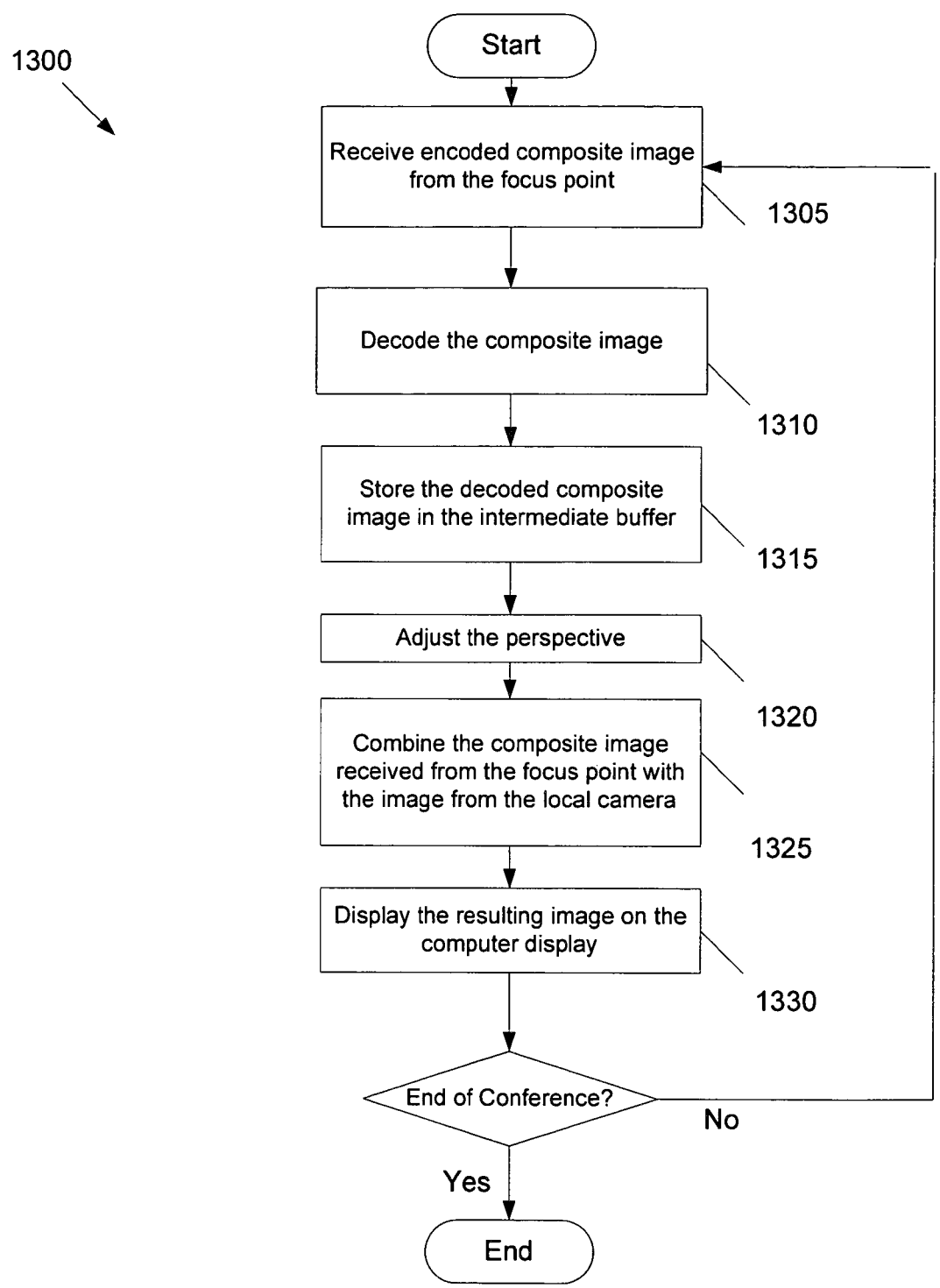
FIG. 13 illustrates the decoding operation of a non-focus point module of some embodiments.

As shown in FIG. 13, the decoding process 1300 of the non-focus point module starts when the non-focus point module receives (at 1305) a video stream that contains a composite frame from the focus point module. Next, the decoder 1210 of the non-focus module 515 decodes (at 1310) the received composite frame.

In some embodiments, the decoder 1210 decodes the composite frame without first extracting the sub-frame that make up the composite frame. In some embodiments, the decoder uses any empty-field flag to identify any sub-frame that is left empty. In other embodiments, the decoder does not need to rely on the empty-field flag, because it can identify the sub-frames through some other approach (e.g., it can identify the sub-frame associated with each macroblock in the composite frame).

Each decoded sub-frame represents a frame of one of the other participants in the video conference. After decoding a composite frame, the decoder stores (at 1315) the sub-frames in the decoded composite frame in an intermediate buffer 1215. In some embodiments, the intermediate buffer 1215 is formed by three smaller intermediate buffers, one for storing each potential sub-frame of the decoded composite frame. At 1320, the perspective adjuster then retrieves the decoded subframe from the intermediate buffer, and adjusts the perspective view of these images of the other conference participant. As mentioned above, FIG. 4 illustrates one example of such perspective views. The adjuster 1220 supplies the adjusted composite frame to the local image controller 1230. The local image controller also receives a video frame of the local non-focus point video-conference participant from the local image capture 1240. From the adjusted frames of the other conference participants and the local participant's captured frame, the local image controller 1230 then renders (at 1325) the video-conference display presentation for display on the display device 1235 of the non-focus computer.

After 1330, the non-focus decoding process 1300 determines (at 1335) whether the multi-participant video conference has terminated. If so, the process 1300 terminates. Otherwise, the process returns to 1305 to receive another encoded composite image.

Figure 14:
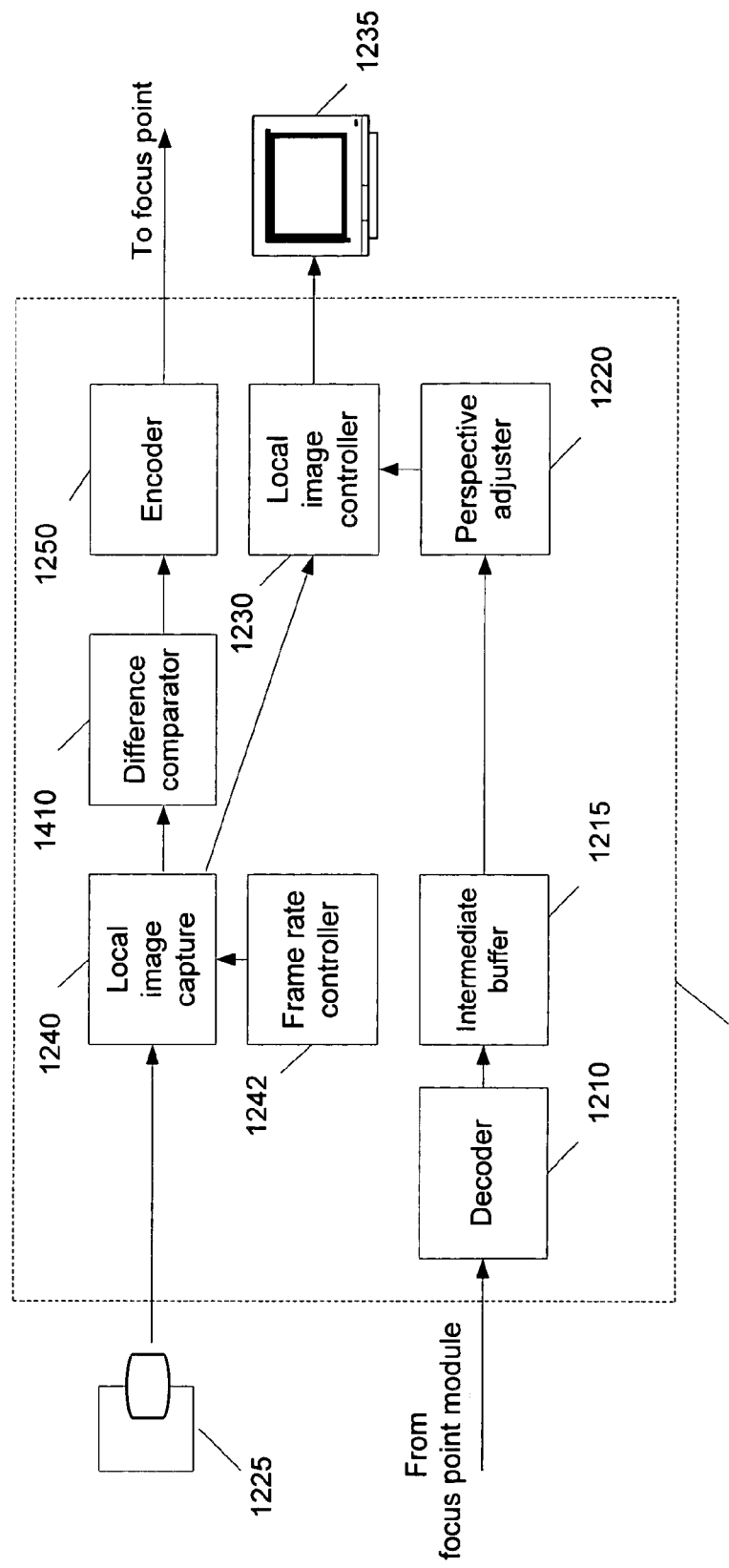
FIG. 14 illustrates the non-focus point module with difference comparator in some embodiments.

As mentioned above, FIG. 13 is a simplified conceptual illustration of the non-focus point module's decoding and encoding operations. In some embodiments, the non-focus point module includes other software modules. For instance, FIG. 14 illustrates an alternative implementation of the non-focus point module. This implementation is identical to the implementation illustrated in FIG. 12, except that the non-focus point module 1400 has a difference comparator 1410.

This difference comparator serves the same role as the difference comparator 910 in FIG. 9. Specifically, it prevents duplicate encoding of identical or very similar locally captured frames. When the local image capture module 1240 captures a frame, it supplies the captured frame to the difference comparator 1410 instead of sending it directly to encoder 1250.

The difference comparator 1410 then supplies the captured frame to the encoder 1250 so long as it determines that the last frame that it supplied to the encoder was not identical or very similar to the captured frame. In some embodiments, the difference comparator 1410 computes a metric that expresses the difference between the received frame and the last frame that the comparator supplied to the encoder 1250. If this metric is lower than a particular threshold, the comparator 1410 will detect that the received frame is identical or very similar to the last frame that it supplied to the encoder.

If the comparator determines that the received frame is identical or very similar to the last frame supplied to the encoder, it discards the received frame, in order to conserve the computational and bandwidth resources of the computers involved in the video conference. Otherwise, the comparator supplies the received frame to the encoder 1250 and maintains a copy of this frame for its difference comparison the next time that it receives a frame from the local image capture.

In some embodiments, the non-focus point module also includes a frame rate controller with update time tracker and an intermediate buffer with timestamp. Similar to the discussion for the focus point module in the previous section, in these embodiments the non-focus point module can save computing resources by avoiding sending duplicate decoded images from the intermediate buffer 1215 to perspective adjuster 1220.

One of ordinary skill in the art will realize that the above-described video encoding, decoding, and distribution techniques have numerous advantages. For instance, the video compositing approach of the focus-point module 510 simplifies the removal of redundant video data, which, in turn, conserves much needed network bandwidth during the video conference.

Figure 15:
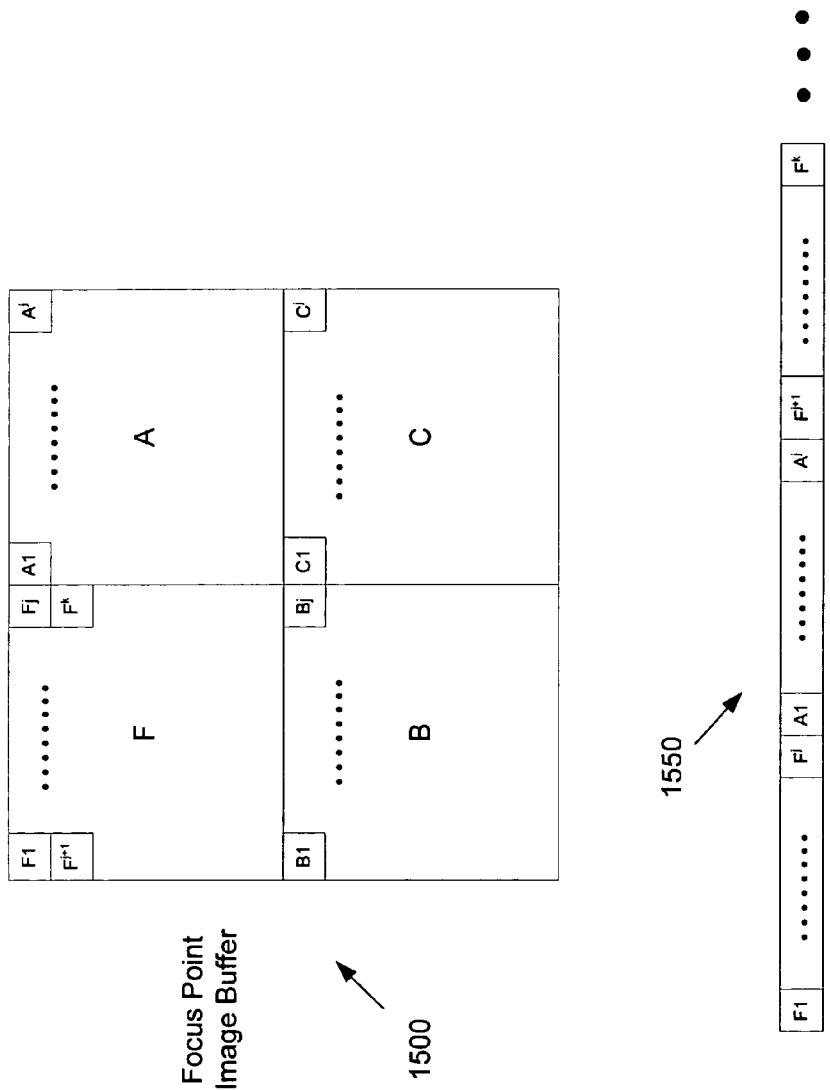
FIG. 15 shows the focus point's 2×2 positioning of participants' sub frames in some embodiments.

To illustrate these benefits, FIG. 15 illustrates another approach for compositing the video data in a 4-way video conference. In this approach, the focus-point module composites the frames of the participants in a 2×2 format 1500. The focus point 510 then encodes and sends the resulting encoded image to each participant. FIG. 15 illustrates that the encoding of the composite 2×2 frame 1500 results in the video stream 1550, which has the video data from the different participants interleaved. Specifically, the initial portion of the video stream 1550, which is illustrated in FIG. 15, shows the video data from the focus-point participant F and the non-focus point participant A interleaved.

Figure 16:
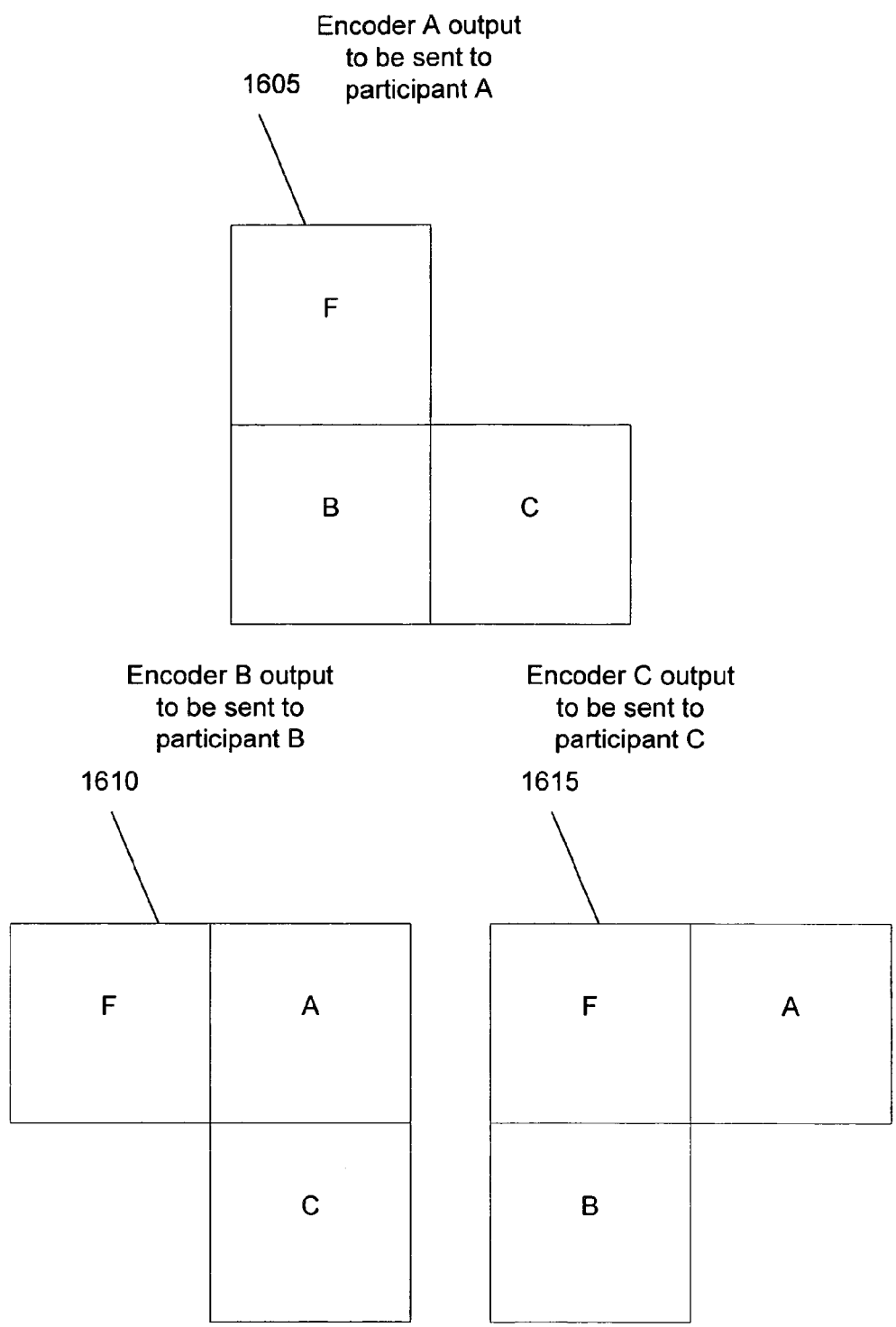
FIG. 16 illustrates how in some embodiments the focus point uses several encoders to eliminate each participant's own image from the composite image the participant receives.

This interleaving makes it difficult to remove each participant's own video data from the video stream that the focus-point module supplies to the participant. To simplify this removal, one solution would be (1) to generate three different composite video frames for three different non-focus participants, as illustrated in FIG. 16, and then (2) to use three different encoders to encode the three different composite video frames. This approach does eliminate each participant's video data from the composite video stream that the participant receives, but it requires more processing resources to support the extra encoders.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. For instance, instead of encoding after producing a composite frame, the focus-point module 510 of some embodiments might encode the frames of the non-focus participant before packaging the encoded frames into one composite frame for transmission. Thus, one of ordinary skill in the art would understand that the invention is not limited by the foregoing illustrative details, but rather is to be defined by the appended claims.

What claimed is:

1. A method of providing a participant module for a video conference having a plurality of participant devices, wherein a first participant device is a central distributor of video content, said method comprising:
   providing, by a second participant device, a local capture component for receiving a plurality of local video frames;
   providing, by the second participant device, a difference comparator module for comparing a first local video frame and a subsequent second local video frame, wherein the first video frame has been transmitted to the central distributor; and
   providing, by the second participant device, an encoder module for transmitting the second video frame to the central distributor when the difference comparator module determines that the first and second video frames are sufficiently different, wherein the encoder module does not transmit the second video frame when the difference comparator module determines that the first and second video frames are not sufficiently different.

2. The method of claim 1, wherein the difference comparator module is for comparing the first and second video frames by computing at least one metric that expresses a difference between the first and second video frames.

3. The method of claim 2, wherein the difference comparator module is for determining that (i) the first and second video frames are not sufficiently different when the metric meets a threshold and (ii) the first and second frames are sufficiently different when the metric does not meet the threshold.

4. The method of claim 1, wherein the first and second video frames are not sufficiently different when they are similar or identical.

5. The method of claim 1, wherein the difference comparator module is further for maintaining a copy of the second video frame to perform a comparison with a subsequent third local video frame when the second video frame is transmitted to the central distributor.

6. The method of claim 1, wherein the first video frame is a most recent local video frame in a series of local video frame transmitted to the central distributor during the video conference.

7. The method of claim 1 further comprising providing a decoding module for receiving video frames from the central distributor and decoding the received video frames for display.

8. The method of claim 7 further comprising providing a perspective adjuster for receiving the decoded video frames and adjusting perspective of the decoded video frames.

9. A non-transitory computer readable medium storing a computer program for execution by at least one processing unit, the computer program comprising:
   a set of instructions for sending a first video frame captured locally on a computing device to a participant device of a video conference;
   a set of instructions for determining whether the first local video frame and a subsequent second video frame captured locally on the computing device are different; and
   a set of instructions for sending the second video frame to the participant device of the video conference when the determination is made that the first and second video frames are different, wherein the second video frame is not sent to the participant device of the video conference when the determination is made that the first and second video frames are similar or identical.

10. The non-transitory computer readable medium of claim 9, wherein the set of instructions for determining whether the first and second video frames are different comprises a set of instructions for comparing the first local video frame to the second local video frame by computing at least one metric that expresses a difference between the first and second video frames.

11. The non-transitory computer readable medium of claim 9 further comprising a set of instructions for maintaining a copy of the second video frame to determine whether a third subsequent video frame captured locally on the computing device is different from the second video frame.

12. For a particular participant device of a video conference between a plurality of participant devices, wherein one participant device is a central distributor of video content for the video conference, a method comprising:
   sending a first video frame captured locally at the particular participant device to the central distributor for the video conference;
   comparing the first video frame and a subsequent second video frame captured locally at the particular participant device to determine whether the second video frame is different from the first video frame by at least a threshold amount;
   sending the second video frame to the central distributor of video content when the first and second video frames are determined to be different by at least the threshold amount, wherein the second video frame is not sent to the central distributor when the first and second video frames are determined to not be different by at least the threshold amount; and
   maintaining a copy of the second video frame to compare with a third subsequent video frame captured locally at the particular participant device.

13. The method of claim 12, wherein comparing the first and second video frames comprises computing at least one metric that expresses a difference between the first and second video frames.

14. The method of claim 13, wherein the first and second video frames are determined to be similar when the metric meets a threshold, and the first and second frames are determined to be different when the metric does not meet the threshold.

15. The method of claim 12, wherein the first video frame is a most recent local video frame in a series of local video frames transmitted to the central distributor during the video conference.

* * * * *